United States Patent
Mackie

(10) Patent No.: US 11,775,959 B2
(45) Date of Patent: Oct. 3, 2023

(54) TRANSACTION AUTHORIZATION

(71) Applicant: VISA EUROPE LIMITED, London (GB)

(72) Inventor: Nicolas David Mackie, London (GB)

(73) Assignee: Visa Europe Limited, London (GB)

( * ) Notice: Subject to any disclaimer, the term of this patent is extended or adjusted under 35 U.S.C. 154(b) by 261 days.

(21) Appl. No.: 15/621,577

(22) Filed: Jun. 13, 2017

(65) Prior Publication Data

US 2017/0278094 A1    Sep. 28, 2017

Related U.S. Application Data

(63) Continuation of application No. PCT/GB2015/054022, filed on Dec. 16, 2015.

(30) Foreign Application Priority Data

Dec. 16, 2014 (GB) .................................... 1422395

(51) Int. Cl.
G06Q 20/32 (2012.01)
G06Q 20/20 (2012.01)
(Continued)

(52) U.S. Cl.
CPC ........... *G06Q 20/352* (2013.01); *G06Q 20/20* (2013.01); *G06Q 20/3224* (2013.01);
(Continued)

(58) Field of Classification Search
None
See application file for complete search history.

(56) References Cited

U.S. PATENT DOCUMENTS 8,028,896 B2    10/2011  Carter et al.
8,336,785 B2 *  12/2012  Phillips ................ G06K 19/005
                                                                  235/492
(Continued)

FOREIGN PATENT DOCUMENTS

CN    102160070    8/2011
CN    102257541    11/2011
(Continued)

OTHER PUBLICATIONS

Jaouad, B. et al., "Architecture of a Mediation System for Mobile Payment", International Journal of Advanced Computer Science and Applications. vol. 5, No. 9, 2014. (Year: 2014).*
(Continued)

*Primary Examiner* — Neha Patel
*Assistant Examiner* — Clay C Lee
(74) *Attorney, Agent, or Firm* — Kilpatrick Townsend & Stockton LLP

(57) ABSTRACT

Methods, apparatus and computer programs for authorizing transactions are described. A server system receives, from a first computing device, verification information relating to a verification process for verifying a user associated with the first computing device. A verification status associated with the user is set in a memory of the server system, based on the verification information. The server system receives an authorization request for a payment transaction from a payment terminal, the request including an identifier associated with the user, and having been provided to the payment terminal by a payment device different from the first computing device. Responsive to receipt of the authorization request, the verification status associated with the user is identified, and a determination as to whether to authorize the payment transaction is made at least partly on the basis of the identified verification status.

17 Claims, 5 Drawing Sheets

(51) Int. Cl.
*G06Q 20/38* (2012.01)
*G06Q 20/34* (2012.01)

(52) U.S. Cl.
CPC ....... *G06Q 20/3278* (2013.01); *G06Q 20/354* (2013.01); *G06Q 20/382* (2013.01)

(56) References Cited

U.S. PATENT DOCUMENTS

| | | | |
|---|---|---|---|
| 8,918,637 B2 | 12/2014 | Wentker et al. | |
| 9,801,063 B2 | 10/2017 | Dennis et al. | |
| 9,838,872 B2 | 12/2017 | Dennis et al. | |
| 2005/0156026 A1* | 7/2005 | Ghosh | G07F 7/1008 235/380 |
| 2006/0006223 A1 | 1/2006 | Harris | |
| 2008/0235144 A1* | 9/2008 | Phillips | G06Q 20/3821 705/67 |
| 2009/0006262 A1* | 1/2009 | Brown | G06Q 20/12 705/64 |
| 2010/0190510 A1* | 7/2010 | Maranhas | G06Q 30/0269 455/456.1 |
| 2011/0154447 A1 | 6/2011 | Dennis et al. | |
| 2011/0202466 A1 | 8/2011 | Carter | |
| 2012/0030121 A1 | 2/2012 | Grellier | |
| 2012/0072350 A1* | 3/2012 | Goldthwaite | G06Q 20/02 705/44 |
| 2012/0246079 A1 | 9/2012 | Wilson et al. | |
| 2012/0265682 A1 | 10/2012 | Menon | |
| 2012/0296818 A1* | 11/2012 | Nuzzi | G06Q 20/4012 705/41 |
| 2013/0066731 A1* | 3/2013 | Finnegan | H04M 3/42 705/15 |
| 2013/0151411 A1* | 6/2013 | Carten | G06Q 20/3821 705/44 |
| 2013/0166402 A1* | 6/2013 | Parento | G07F 7/1008 235/380 |
| 2013/0197998 A1 | 8/2013 | Buhrmann et al. | |
| 2013/0211929 A1* | 8/2013 | Itwaru | G06Q 20/4012 705/16 |
| 2013/0282438 A1* | 10/2013 | Hunter | G01S 1/72 705/7.32 |
| 2014/0058951 A1* | 2/2014 | Kuppuswamy | G06Q 20/223 705/67 |
| 2014/0129441 A1* | 5/2014 | Blanco | G06Q 20/401 705/44 |
| 2014/0188640 A1 | 7/2014 | Phillips et al. | |
| 2014/0351899 A1 | 11/2014 | Dennis et al. | |
| 2015/0046340 A1 | 2/2015 | Dimmick | |
| 2016/0086186 A1* | 3/2016 | Candelore | G06Q 20/40145 705/44 |
| 2016/0227405 A1 | 8/2016 | Dennis et al. | |
| 2017/0200152 A1* | 7/2017 | Winkler | G06Q 20/321 |
| 2017/0280323 A1 | 9/2017 | Dennis et al. | |

FOREIGN PATENT DOCUMENTS

| | | | |
|---|---|---|---|
| CN | 102609839 | 7/2012 | |
| CN | 102640176 | 8/2012 | |
| CN | 102737310 | 10/2012 | |
| KR | 20060034228 A | 4/2006 | |
| WO | 2005001618 A2 | 1/2005 | |
| WO | WO-2007143740 A2 * | 12/2007 | ............... G06K 5/00 |
| WO | 2008002979 A2 | 1/2008 | |
| WO | 2010043722 A1 | 4/2010 | |
| WO | WO-2010043722 A1 * | 4/2010 | ............. G06Q 20/32 |
| WO | 2013156796 A1 | 10/2013 | |

OTHER PUBLICATIONS

EMV Integrated Circuit Card Specifications for Payment Systems, Book 3 Application Specification, Version 4.3, Nov. 2011. (Year: 2011).*
EMVCO LLC EMV Integrated Circuit Card Specifications for Payment Systems, Book 3—Application specification, Version 4.3 Nov. 2011, 230 pages.
Examination Report in GB Application No. GB1422395.2, dated Apr. 10, 2018, 6 pages.
CN201580068452.6 , "Office Action", dated Aug. 12, 2020, 13 pages.
Chinese Office Action dated Mar. 4, 2020 for CN Patent Application No. 201580068452.6, 10 pages.
"EMV Contactless Specifications for Payment Systems", EMVCO, Book C-7, Kernel 7 Specification, Version 2.4, Feb. 2014, 80 pages.
EP15826147.9 , "Summons to Attend Oral Proceedings", Feb. 23, 2022, 13 pages.
Application No. KR10-2017-7019516 , Office Action, dated Jul. 29, 2022, 7 pages.

\* cited by examiner

| Identifier | Status | Account information |
|---|---|---|
| PAN 1 | Verified | ACC 1 |
| PAN 2 | Not verified | ACC 2 |
| PAN 3 | Not verified | ACC 3 |
| . | . | . |
| . | . | . |

TRANSACTION AUTHORIZATION

CROSS-REFERENCE TO RELATED APPLICATIONS

This application is a continuation of International Application No. PCT/GB2015/054022, filed Dec. 16, 2015, which claims priority to UK Application No. GB 1422395.2, filed Dec. 16, 2014. Each of the above-referenced patent applications is incorporated by reference in its entirety.

BACKGROUND OF THE INVENTION

Field of the Invention

The present invention relates to systems and methods for authorizing electronic payment transactions, and in particular, but not exclusively to authorizing contactless payment transactions made at a point of sales using a payment device.

Description of the Related Technology

A variety of methods for effecting payment transactions without the use of cash exist. For example, payment may be effected using a financial instrument such as a payment card by interacting with an electronic payment terminal, which may be located at a Point of Sales (POS) within an establishment such as a retail establishment or restaurant. The financial instrument may include a magnetic stripe containing information such as data relating to the account holder and an account from where the funds for the transaction may be drawn. The magnetic card is typically swiped through a magnetic card reader which reads data necessary for enacting the transaction. In another example, some financial instruments are embedded with a semiconductor device (a "chip") storing the above information; an interface is provided on the card for interacting with a card reader, which may take the form of physical pads.

Transactions using financial instruments may involve verification (authentication) of the user by the user providing a signature. Alternatively, the user may be required to input a Personal Identification Number (PIN) on the terminal when prompted, which is sent to a server, in encrypted form, for verification; this is often referred to as online PIN verification. In the case of a financial instrument including a chip as described above, the chip may include a secure memory storing the PIN data. In this case, the user enters a PIN on the terminal when prompted, which is compared with the PIN stored in the card; this is often referred to as offline PIN verification.

Each of the above methods can be time consuming and inconvenient for the user. Payment transaction methods which do not involve verification of the user have also been developed. For example, a so-called contactless payment transaction method may be used. A contactless payment device is provided with an antenna which enables it to interact with a contactless payment terminal when held in close proximity to same, to provide the information necessary to enact a payment transaction as described above.

Such payment transactions often do not require the user to perform a verification process, such as the provision of a signature or a PIN as described above. This enables the payment transactions to be performed quickly and easily, but also involves a lower level of security of the transactions. One countermeasure against fraud that has been implemented is to impose a limit on the value of transactions that may be enacted using contactless payment methods without user verification in all countries which operate such methods. For transactions above this limit, it may be necessary for the user to provide a PIN, for example where the infrastructure for online PIN verification exists, or the user may be required to use a different payment method, such as 'Chip & PIN'. This means that the convenience of contactless payment transactions is reduced.

SUMMARY

In accordance with at least one embodiment, methods, devices, systems and software are provided for supporting or implementing functionality to authorize a payment transaction.

This is achieved by a combination of features recited in each independent claim. Accordingly, dependent claims prescribe further detailed implementations of various embodiments.

In accordance with a first aspect, there is provided a method of authorizing a payment transaction, the method comprising: receiving, at a server system, from a first computing device, verification information relating to a verification process for verifying a user associated with the first computing device; setting a verification status associated with the user in a memory of the server system, based on the verification information; receiving, at the server system, an authorization request to authorize a payment transaction, the authorization request being received from a payment terminal and including an identifier associated with the user, the identifier having been provided to the payment terminal by a payment device, the payment device being different from the first computing device; responsive to receipt of the authorization request, identifying the verification status associated with the user based on the identifier; and determining whether to authorize the payment transaction at least partly on the basis of the identified verification status.

The method may comprise: setting the verification status to indicate a verified status on the basis of the verification information; and setting the verification status to indicate a non-verified status in response to one or more predetermined conditions being satisfied.

The one or more predetermined conditions may comprise one or more of: a predetermined time period having elapsed; a predetermined number of transaction requests having been received; and a predefined transaction total being reached.

The payment transaction may comprise a contactless payment transaction, the payment terminal may comprises a contactless payment terminal and the payment device may comprise a contactless payment device. The contactless payment device comprises a fob or tag device.

In some embodiments, the payment transaction does not comprise a verification process to verify the user.

The method may comprise sending a message indicating whether the payment transaction is authorized to the payment terminal in response to said determination.

The determination may be performed partly on the basis of a comparison of a value of the transaction with a predetermined threshold value.

The verification information may comprise an indication that the user has been verified.

Alternatively, the verification information may comprise information input to the first computing device by the user, and the method comprises performing said verification process at the server system on the basis of thereof.

The verification information may comprise receiving the verification information in a Short Message Service (SMS) message. The verification information may be received from a software application held on the first computing device.

In accordance with a second aspect, there is provided a computer program for authorizing a payment transaction, the computer program comprising instructions for a server system to perform a method of authorizing a payment transaction, the method comprising: receiving, at a server system, from a first computing device, verification information relating to a verification process for verifying a user associated with the first computing device; setting a verification status associated with the user in a memory of the server system, based on the verification information; receiving, at the server system, an authorization request to authorize a payment transaction, the authorization request being received from a payment terminal and including an identifier associated with the user, the identifier having been provided to the payment terminal by a payment device, the payment device being different from the first computing device; responsive to receipt of the authorization request, identifying the verification status associated with the user based on the identifier; and determining whether to authorize the payment transaction at least partly on the basis of the identified verification status.

The second aspect may include one or features corresponding to one or more of the features described above in relation to the first aspect.

In accordance with a third aspect, there is provided apparatus for authorizing a contactless payment transaction, the apparatus being arranged to: receive from a first computing device, verification information relating to a verification process for verifying a user associated with the first computing device; set a verification status associated with the user in a memory, based on the verification information; receive an authorization request to authorize a payment transaction, the authorization request being received from a payment terminal and including an identifier associated with the user, the identifier having been provided to the payment terminal by a payment device, the payment device being different from the first computing device; responsive to receipt of the authorization request, identify the verification status associated with the user based on the identifier; and determine whether to authorize the payment transaction at least partly on the basis of the identified verification status.

The third aspect may include one or features corresponding to one or more of the features described above in relation to the first aspect.

Further features and advantages will become apparent from the following description of preferred embodiments, given by way of example only, which is made with reference to the accompanying drawings.

DETAILED DESCRIPTION OF CERTAIN INVENTIVE EMBODIMENTS

Figure 1:
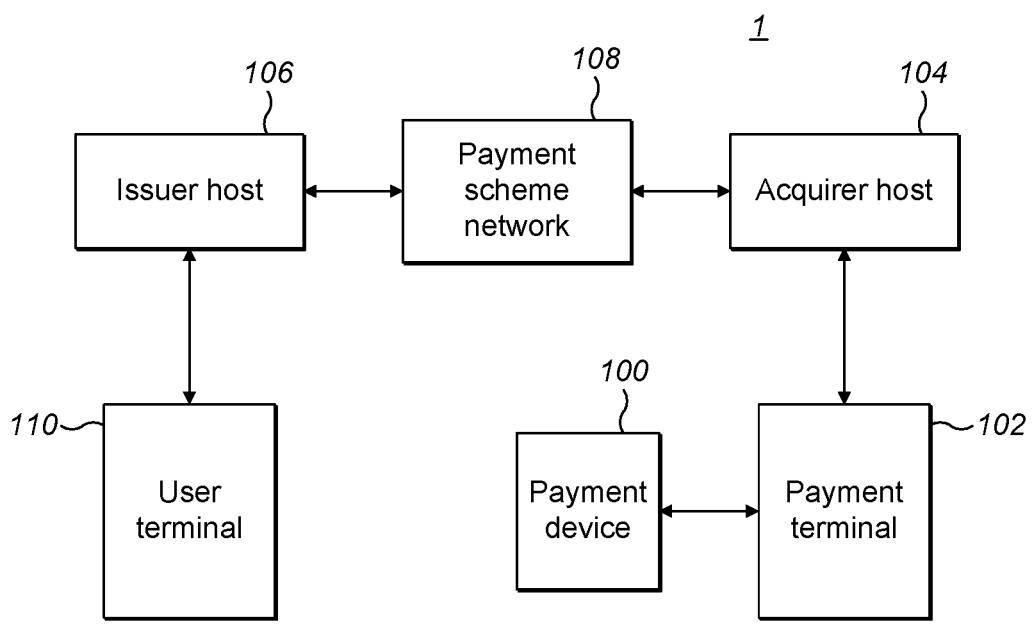
FIG. 1 shows a schematic diagram of a payment transaction system in which embodiments of the invention may be practiced.

FIG. 1 illustrates a transaction system 1 in which embodiments may be implemented. The system includes a contactless payment device 100 and a contactless payment terminal 102, which may be used to initiate a contactless payment transaction as described below. The contactless payment terminal 102 may be located at a Point of Sales (POS), such as a business premises, for example a shop, restaurant, cinema, station or other location, and be arranged to process payment transactions on behalf of the business or other entity associated with the POS.

The contactless payment terminal 102 is able to maintain or establish a data connection with an acquirer host 104 which typically takes the form of a server system of one or more computing devices for processing transactions associated with a financial institution, such as a bank, which manages one or more financial accounts of the entity associated with the POS.

An issuer host 106 is a server system of one or more computing devices arranged to process transactions associated with a financial institution, such as a bank, which manages one or more financial accounts of a user of the payment device 100.

Each of the acquirer host 104 and the issuer host 106 is capable of communicating with a payment scheme network 108. The payment scheme network 108 is a server system of computing devices which may be associated with a financial services organization, for example.

The system 1 also includes a user terminal 110 associated with the user. The user terminal 110 is arranged to participate in a user verification process, as described below.

While the system 1 in FIG. 1 shows only one contactless payment terminal 102, it will be appreciated that any given acquirer host 104 will typically be arranged to communicate with many different contactless payment terminals 102, directly or indirectly. Similarly, the issuer host 106 is typically arranged to communicate with multiple acquirer hosts 104 via multiple payment scheme networks 108, and each payment scheme network will typically be arranged to communicate with many different issuer hosts 106. Further, each contactless payment terminal 102 may communicate with multiple contactless payment devices 100 associated with different users, which each use a different user terminal 110 in verification processes as described herein.

Communications between the different entities shown in FIG. 1 may take place using one or more of various different communications protocols and methods, including communications via wireless and/or wired communications methods and including the Internet.

Figure 2A:
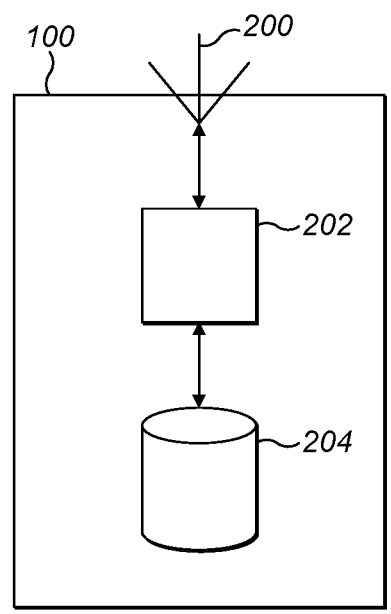
FIG. 2a schematically illustrates a payment device for use in an embodiment.

FIG. 2a illustrates a contactless payment device 100 for use in embodiments. The contactless payment device 100 may take the form of a fob, a tag, a financial instrument such as payment card, or another device such as a smart watch. The contactless payment device 100 includes a communications interface 200, which may comprise an antenna, for wirelessly communicating with a contactless payment terminal using a short range communications technology, for example a radio frequency technology, such as a near field communications (NFC) technology, or an infra-red or other optical communications technology.

The contactless payment device 100 also includes a processing device 202 such as a semiconductor chip and a memory 204. The memory 204 is arranged to store data associated with the user, such as an identifier associated with the user; this identifier may be an identifier of a financial account of the user, such as a primary account number (PAN). The memory 204 may also store other data relating to the financial account to which the PAN relates, such as an expiry date, issue number and/or other data. The memory 204 may also store an indicator indicating that a verification method in accordance with an embodiment is to be used. The stored data may be suitable for use in an EMV transaction.

The contactless payment device 100 is arranged to interact with the contactless transaction terminal 102 to provide some or all of this data via the communications interface 200 and corresponding communications interface (not shown) in the payment terminal 102, when brought into sufficiently close contact with the contactless transaction terminal 102.

In some embodiments, the contactless payment device 100 does not include a user input device, such as a keypad or the like, or any other means of participating in a user verification process. This may be the case where the contactless payment device 100 is a fob or card or the like. This enables the contactless payment device 100 to be of small dimensions and/or low weight, improving the convenience for the user.

Figure 2B:
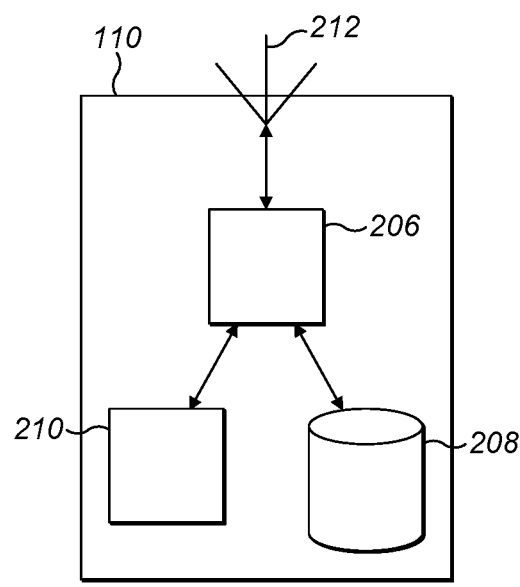
FIG. 2b schematically illustrates a payment terminal for use in an embodiment.

FIG. 2b illustrates a user terminal 110 for use in embodiments. The user terminal 110 comprises a computing device such as a personal computer, for example a lap top or desk top computer, or a mobile device such as tablet computer or smartphone. In the embodiment illustrated in FIG. 2b the user terminal 110 includes one or more processors 206, a memory 208, a user input device 210 and a communications interface 212. The memory 208 may hold a software application or applet including instructions readable by the processor 206 to perform a verification process as described below. The user input 210 device may comprise one or more of a keypad, a touchscreen, a mouse pad and a biometric sensor such as a fingerprint reader. Although not shown, the user terminal 110 typically includes other components such as a display screen.

Figures 3A, 3B:
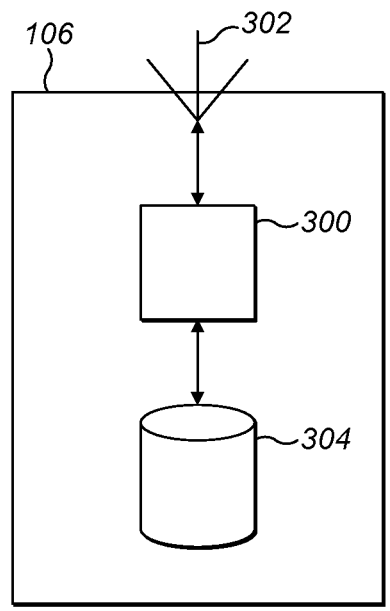
FIG. 3a schematically illustrates a server system according to an embodiment.
FIG. 3b schematically illustrates a look-up table for use in an embodiment.

FIG. 3a illustrates an issuer host 106 for use in embodiments. The illustrated issuer host 106 includes one or more processors 300, a communications interface 302 and a memory 304 which holds software including instructions executable for performing processes for authorizing a payment transaction as described herein.

The memory 302 may also store data indicating an authorization status associated with different users. FIG. 3b shows an example in the form of a table 306. The table includes a set of identifier entries 308, a corresponding set of status entries 310 and a corresponding set of account information entries 312. The identifier entries 308 may comprise a PAN, or other identifier associated with a financial account. The status entries 310 each include an indicator of a verification status of a user associated with the financial account (e.g. the owner of the account). The indicators may take the form of a flag field, for example. The account information entries 312 include information relating to the financial account associated with the corresponding identifier. This may include an indication of an account balance associated with the financial account, for example.

The issuer host 106 sets the verification status of users indicated in the status field 310, for the accounts or account ranges operating in this mode, based on verification information received from the user terminal 110. For example, the user terminal 110 comprises a user input device 210; this user input device 210 may be used to receive input from the user to perform a verification process. For example, as described above, the memory 208 of the user terminal 110 may store software for performing a process to verify the user, or the user terminal 110 may connect to the issuer host 106 to perform a user verification. For example, when the user wishes to be able to perform contactless payment transactions using the contactless payment device 100, he or she may start up the software in order to perform the verification process. The verification process may be initiated by selection of an option in the software, for example. Once the application has been executed, the user provides information via the user input device 210 in order to verify themselves. The provided information may be for example user credentials such as a username and/or password or passcode, or may take some other form, for example, biometric data such as a fingerprint provided via a fingerprint reader for example.

Once the user input has been received at the user terminal 110 via the user input device 210, the user terminal 110 may itself verify the user by, for example, comparing received user credentials or biometric data with registered data stored in the memory 208. If the user is verified, then the user terminal 110 sends a verification message to the issuer host 106 indicating that the user is verified. The verification message may be protected using a cryptographic mechanism, for example. The verification message may include an identifier associated with the user, such as a PAN; this identifier may be stored in the memory 208 of the user terminal 110, for example. Alternatively or additionally, the verification message may include another identifier, such as a username, on the basis of which the issuer host 106 identifies the user and associated financial account etc., or an identifier of the user terminal 110. Once the issuer host 106 has received the verification message and identified the corresponding entry in the table 306, it sets the appropriate status entry to indicate a verified status.

Alternatively, the verification of the user may be performed by the issuer host 106. In this case, the information received from the user via the user input device 206 is sent to the issuer host 106, and the issuer host 106 performs the verification based on this received information by, for example, comparing it with information stored in the memory 304. If it determines that the user is verified, it set the corresponding status entry to indicate a verified status, as above.

Various other methods of verification may be used. For example, a verification message may be sent in response to a user unlocking the user terminal 110. In another example, a user may send a message such as a Short Message Service (SMS) message to the issuer host 106 via a telephony network including information such as a predetermined alphanumeric code, for verification by the issuer host 106.

Further, the verification process may be based, at least in part, on whether or not the contactless payment device 100 is proximate to the user terminal 110 (for example, whether it is within a certain predefined range). For example, a verification process as described above may only be enabled in the case that the user terminal 110 determines that the contactless payment device 102 is in its proximity. In another example, the user terminal 110 may base verification of the user on the proximity or otherwise of the contactless payment device 100, and send a verification message as described above in response to determining that the contactless payment device 100 is proximate. This may be done periodically, in order to maintain a verified status of the user.

The proximity of the contactless payment device 100 may be detected by, for example, a connection between the contactless payment device 100 and the user terminal 110 provided by technology such as Bluetooth™ or Bluetooth Low Energy™ (Bluetooth LE™). For example, if a signal from the contactless payment device 100 is detected, it may be determined that it is proximate (e.g. in range). In another example, the issuer host 106 may determine whether the devices are proximate based on GPS coordinates of the user terminal 110 and payment device 100. The GPS coordinates of the payment device 100 could be provided as part of the transaction data, and the GPS coordinates of the user terminal 110 could be provided as part of the verification process, for example.

Once the verification status for a given user has been set to indicate a verified status, the issuer host 106 may be triggered to set the status to indicate a unauthorized status in response to, for example, a predetermined time period elapsing, a number of transactions being authorized, transactions totaling a predetermined value having been authorized, or some combination of these. The conditions which trigger the setting of an unauthorized status may be set by the user, via the application on the user terminal 110 for example.

These features improve security by ensuring that in the event that the contactless payment device 100 is lost or stolen, there is a limit on the extent that it can be used for transactions by a third party, while providing flexibility for the user to set the conditions such that he or she is not required to perform a verification process for each individual transaction, for example.

Figure 4:
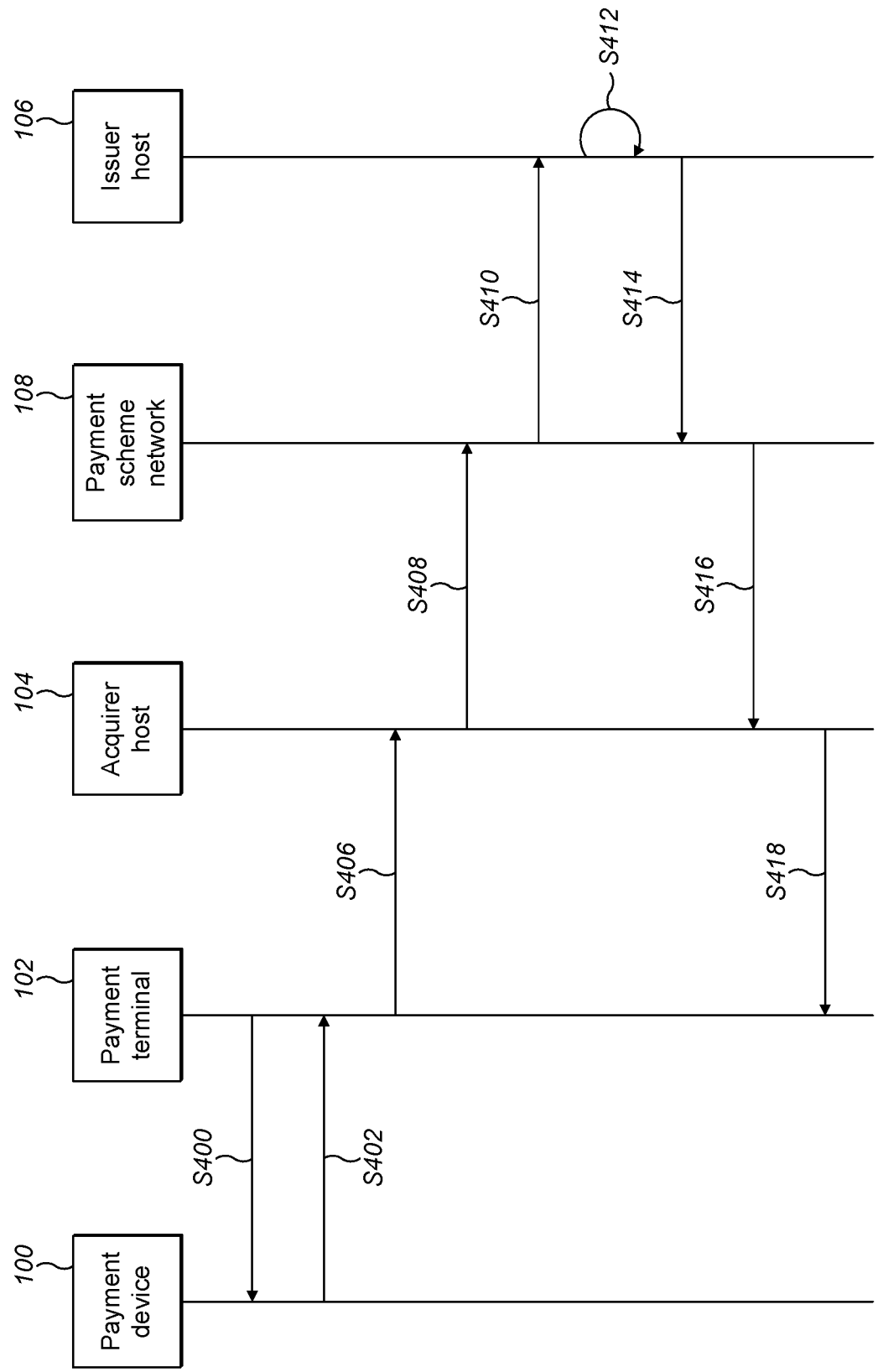
FIG. 4 is a message flow diagram illustrating a message flow according to an embodiment.

FIG. 4 shows message flows in authorizing a contactless payment transaction in accordance with an embodiment. Typically, the contactless payment terminal 102 is configured to initiate a payment by a vendor. For example, the vendor may manually enter a transaction amount into the contactless payment terminal 102, or the value of goods and/or services due for payment may be determined by some other means, such as by a barcode reader reading barcodes provided on products for purchase, for example. In order to initiate a contactless payment transaction, it may be necessary to select a particular option on the contactless payment terminal 102, the contactless payment terminal 102 may be configured only to accept contactless payments or it may be configured to automatically enact a contactless payment transaction on detection of an appropriate contactless payment device 100.

Once the contactless payment terminal 102 has been appropriately configured, the user (e.g. customer at a retail establishment) brings the contactless payment device 100 into proximity with the contactless payment terminal 102. This results, for example, in the contactless payment terminal 102 sending, at step S400, a request to the contactless payment device 100 to provide data for enacting the payment transaction. In response, the payment transaction device 100 retrieves data from the memory 204 and sends same to the contactless payment terminal 102 at step S402. The provided data may include data identifying a payment account from which funds are to be drawn in the payment transaction, such as a PAN and an identifier of the issuer associated with the contactless payment device 100. The response may also include a verification method identifier that a verification method in accordance with embodiments is to be used. This identifier may be included in a data field of the response, such as a data field used for identifying a verification method to be used in a transaction or to indicate that the user has been verified. This field, which may be referred to as a cardholder verification method (CVM) field, may be a field such as the Card Transaction Qualifiers (CTQ) field in an EMV-compliant message indicating a type of verification method to be used in the transaction; depending on the value in the CVM field, the user may be required to, for example, enter a PIN or provide a signature. Alternatively, the CVM field (e.g. CTQ field) may indicate that cardholder verification has already been performed on the contactless payment device 100.

The response message sent by the contactless payment device 100 at step S402 may be in protected form. For example, it may comprise a cryptogram, for example an EMV compliant Authorization ReQuest Cryptogram (ARQC).

On receipt of the response message, the contactless payment terminal 102 determines, based on, for example, the presence of an ARQC that it is to obtain authorization information from the issuer host 106. The contactless payment terminal 102 then sends an authorization request message to acquirer host 104 at step S406, the message including the information received from the contactless payment device 100 at step S402. The message may also include a transaction identifier to identify the transaction, the identifier being included in the message by the contactless payment terminal 102. The message may also include other data added by the contactless payment terminal 102, such as a value of the transaction.

On receipt of the message, the acquirer host 104 forwards same to the payment scheme network at step S408. In the present embodiment, the payment scheme network 108 routes the message to the issuer host 106 (for example, based on an indicator of the issuer included in the message) at step S410.

The issuer host 106 receives the authorization request message, cryptographically verifying same where appropriate, and performs a determination process to determine whether to authorize the contactless payment transaction at step S412. The determination is based, at least in part, on information received in the message received at step S410. This process is described in detail below with reference to FIG. 5.

At step S414 the issuer host 106 returns a result of the determination to the payment scheme network 108 in a message sent at step S414. The message includes an indicator as to whether or not the transaction is authorized. It may also include a transaction identifier the same as or corresponding to the transaction identifier provided by the contactless payment terminal 102 as described above.

The message sent by the issuer host 106 is routed to the contactless payment terminal 102 via the payment scheme network 108 and acquirer hosts 104 at steps S416 and S418. On receipt of the message, the payment terminal 102 identifies the result of the verification based on the content of the message, and may indicate same, for example on a display screen of the contactless payment terminal 102. If the contactless payment transaction is not authorized, the user may be presented with further options for completing the transaction. Additionally or alternatively, if the contactless payment transaction is not authorized, the issuer host 106 may send a message, such as a push notification to the user terminal 110 to prompt the user to perform a verification process as described above in order that the transaction may be authorized.

Figure 5:
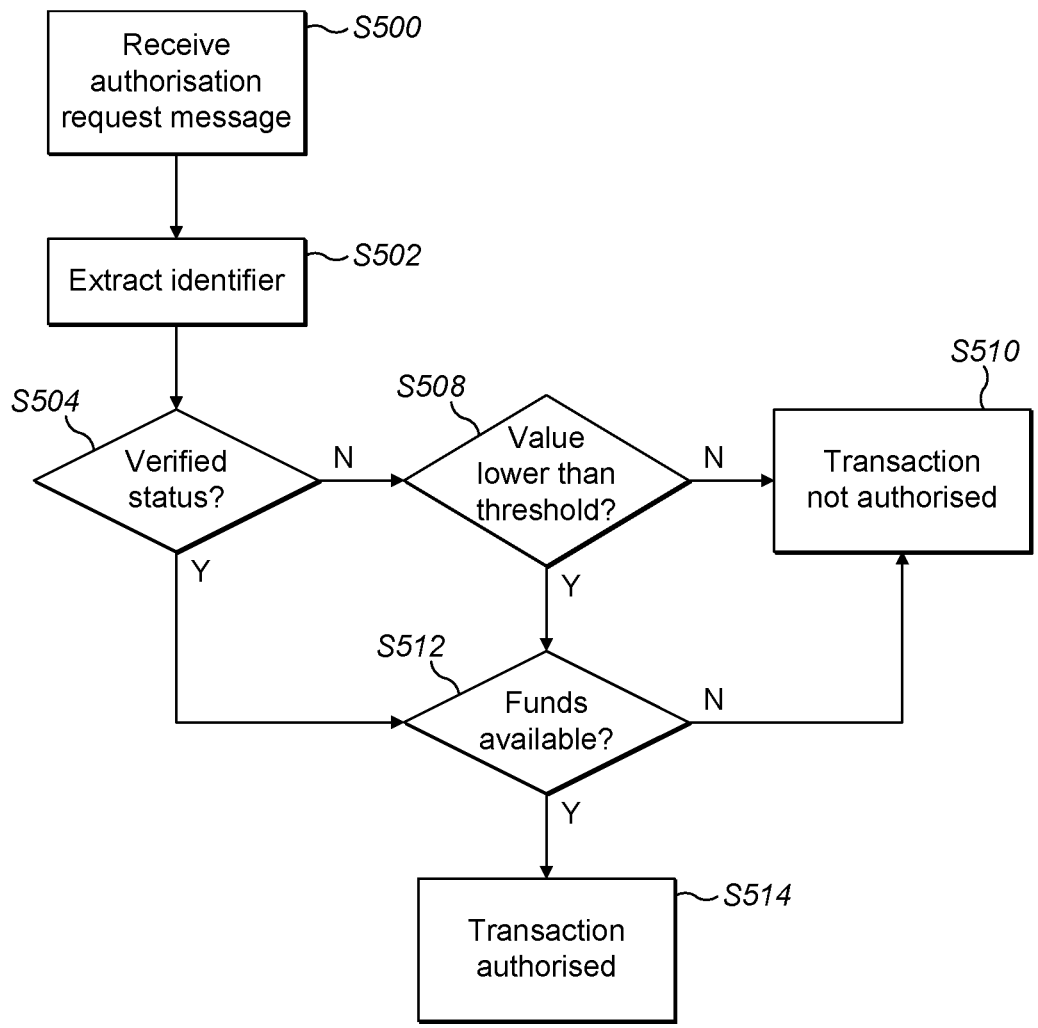
FIG. 5 shows a process flow of a verification process performed by a server system according to an embodiment.

An exemplary process by which the issuer host 106 determines whether to authorize the contactless payment transaction is now described with reference to FIG. 5.

At step S500 the issuer host 106 receives the authorization request message received from the contactless payment terminal 102, as described above. At Step S502 the issuer host extracts the identifier (e.g. PAN) included in the request message. At step S504, the issuer host compares the extracted identifier with those included in the identifier field 308 of the table 306. If no matching or corresponding identifier is found, an error message may be sent to the contactless payment terminal 102.

If a matching or corresponding identifier is found, at step S504 determines a verification status associated with the user by reading the entry in the status field 310 of the table 306 corresponding to the matching or corresponding identifier. If the entry indicates that the user is verified, the process proceeds to step S512 where the issuer host performs further checks to determine whether or not to authorize the transaction. As shown, this may involve determining whether sufficient funds are available for the transaction, for example by retrieving data from the account information field 312 of the table 306. The further checks may additionally or alternatively comprise checking other information associated with the account, such as an expiry date associated with the contactless payment device, for example.

If, based on the further checks performed at step S512, the issuer host 106 determines that the transaction is authorized (for example, sufficient funds are available), the issuer host authorizes the transaction at step S514 and sends an authorization message as described above in relation to step S414 and subsequent steps. If, based on the further checks performed at step S512, the issuer host 106 determines that the transaction is not authorized, the issuer host 106 sends a non-authorization message as described above in relation to step S414 and subsequent steps.

Returning to step S504, if the issuer host 106 determines that the verification status is not-verified, the process proceeds to step S508. At step S508, the issuer host 106 determines a value of the transaction, for example based on information included in the authorization request message received at step S500, and determines whether the determined value is lower than a threshold value. If it is determined that the value is not lower than the threshold value, process proceeds to step S510 where the issuer host 106 determines that the transaction is not authorized, as described above.

On the other hand, if the value of the transaction is lower than the threshold value, the process proceeds to step S512, where the further checks described above are performed.

It should be noted that the order of the steps described above in relation to FIG. 5 may be varied and/or some steps may be omitted. For example, the step of comparing the value of the transaction with a threshold value as described above at step S508 provides the advantage that transactions below a predetermined value may be authorized, without requiring the user to verify themselves as described above. However, in some cases this comparison may be omitted. In still other cases, the comparison may be performed prior to the determination of verification status at step S504, with the determination of verification status only being performed in the case that it is determined that the transaction value is not lower than the threshold value.

Similarly, the further checks described above in relation to step S512 may be omitted, or performed prior to the determination of verification status, for example.

Although many of the processes described above were described as being performed by the issuer host 106, in some embodiments, part or all of the process is performed by one or more other entities. For example, the payment scheme network 108 may store table 306 and perform the user verification process described above. In this case, the determination of verification status described above may be performed by the payment scheme network 104 in response to receiving the verification request message at step S408 above; the payment scheme network 108 may also perform the comparison with a threshold value described above in relation to step S508. The payment scheme network 108 may then add an indication that the transaction is validated into the authorization request message, which it then sends to the issuer host 106, which may then perform the further checks described above in relation to step S512, for example.

Although the above systems and methods have been described in the context of contactless payment transactions, other types of payment transactions may be used. For example, the above payment authorization methods may be used for payments in which a financial instrument such as a debit or credit card is brought into contact with a payment terminal, for example by swiping a magnetic strip on the card on a reader of the payment terminal or inserting a card including a chip into a reader on the payment terminal.

The systems and methods above provide a convenient and secure way of authorizing payment transactions. Because the verification status of the user is stored in a memory of the entity authorizing the transaction, the user is relieved from the burden of having to verify themselves at the time of making the transaction, without compromising the security of the transaction. Further, secure transactions are enabled even in the case that the payment device 100 does not include an input means, or any facility for verifying the user.

The various memories described above may take the form of any suitable date store, including Random Access Memory (RAM) and/or Read Only Memory (ROM) data stores. The various processors may take the form of a semiconductor chip, such as a Central Processing Unit (CPU) for example.

The above embodiments are to be understood as illustrative examples of the invention. Further embodiments of the invention are envisaged. For example, although in the above example, the contactless payment device 100 provided an indicator for the contactless payment terminal 102 to request authorization from the issuer host 106 and/or payment scheme network 108, in some cases this may not be necessary. For example, the payment terminal may be arranged to request verification from the issuer host 106 and/or payment scheme network 108 for all transactions, without requiring an indicator of a verification method to be used.

Further, the software application or applet held on the user terminal 110 may include other features not described above. For example, it may provide access to account information of the financial account associated with the user.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. The features of the claims may be combined in combinations other than those specified in the claims.

What is claimed is:

1. A method of authorizing a payment transaction, the method comprising:
verifying, by a first computing device, a user by: (i) capturing biometric data via a biometric sensor, and (ii) comparing the biometric data captured by the biometric sensor to registered biometric data, the first computing device being a smartphone;

determining, by the first computing device that the first computing device is in a short range communication with a payment device comprising an account number associated with the user;

receiving, at a server system, from the first computing device comprising a memory storing the account number of an account held by the user, a verification message comprising the account number, a first indication that the first computing device verified the user, and a second indication that the first computing device determined that the first computing device is within the short range communication with the payment device comprising the account number associated with the user, the payment device being in form of a card and the second indication produced in response to a signal received by the first computing device from the payment device, which is proximate to the first computing device, wherein the first computing device and the payment device are operated by the user and are separate from a payment terminal;

responsive to receiving the verification message and based on the first indication and the second indication, determining, by the server system, that the first computing device is within the short range communication of the payment device associated with the user, and that the user was verified by the first computing device;

setting, by the server system, a verification status associated with the user to be authorized in a memory of the server system, based on determining that the first computing device is proximate to and within the short range communication of the payment device, and that the user was verified by the first computing device;

determining, by the server system, a number of transactions that have been authorized upon the verification status being set to authorized;

responsive to the number of transactions that have been authorized exceeding a threshold value of transactions, resetting, by the server system, the verification status as being unauthorized;

receiving, at the server system, an authorization request comprising the account number to authorize the payment transaction, the authorization request being received from the payment terminal after detecting the payment device, and receiving the account number from the payment device, the authorization request including a cardholder verification method (CVM) field indicating that the user was verified and that verification has been performed, wherein the payment terminal is a POS terminal;

responsive to receipt of the authorization request, identifying, at the server system, the verification status associated with the user by analyzing the CVM field included in the authorization request; and determining, at the server system, whether to authorize the payment transaction based on the verification status and the number of transactions that have been authorized being lower than the threshold value of transactions, wherein the payment transaction does not comprise a verification process to verify the user.

2. The method of claim 1, wherein the authorization request is an EMV-compliant message and the CVM field is a card transaction qualifiers (CTQ) field.

3. The method of claim 1, wherein the server system is further configured to reset the verification status as being unauthorized in response to a predefined transaction total being reached.

4. The method of claim 1, wherein the payment transaction comprises a contactless payment transaction, the payment terminal comprises a contactless payment terminal and the payment device comprises a contactless payment device.

5. The method of claim 1, wherein the signal is an NFC signal.

6. The method of claim 1, further comprising:
sending, by the server system, a message indicating whether the payment transaction is authorized to the payment terminal.

7. The method of claim 1, wherein the server system determines whether to authorize the payment transaction based on a comparison of a value of the payment transaction with a predetermined threshold value.

8. The method of claim 1, wherein the card is a payment card.

9. The method of claim 1, wherein the short range communication is a Bluetooth communication.

10. The method of claim 9, wherein the verification message is a Short Message Service (SMS) message.

11. The method of claim 1, wherein the verification message comprises verification information from a software application held on the first computing device.

12. The method of claim 1, wherein the server system comprises an issuer host.

13. A system comprising:
a processor; and
a non-transitory computer readable medium, the non-transitory computer readable medium comprising code, executable by the processor to cause the system to:
verify, by a first computing device, a user by: (i) capturing biometric data via a biometric sensor, and (ii) comparing the biometric data captured by the biometric sensor to registered biometric data, the first computing device being a smartphone;
determine, by the first computing device that the first computing device is in a short range communication with a payment device comprising an account number associated with the user;
receive, at a server system, a verification message from the first computing device comprising a memory storing the account number of an account held by the user, the first computing device different from the payment device associated with the user, the verification message comprising the account number, a first indication that the first computing device verified the user, and a second indication that the first computing device determined that the first computing device is within the short range communication with the payment device comprising the account number and associated with the user, the payment device being in form of a card and the second indication produced in response to a signal received by the first computing device from the payment device, which is proximate to the first computing device, wherein the first computing device and the payment device are operated by the user and are separate from a payment terminal;
responsive to receiving the verification message and based on the first indication and the second indication, determine, by the server system, that the first computing device is within the short range communication of the payment device associated with the user, and that the user was verified by the first computing device;
set, by the server system, a verification status associated with the user to be authorized in a memory of the server system, based on determining that the first computing device is proximate to and within the short range communication of the payment device, and that the user was verified by the first computing device;

determine, by the server system, a number of transactions that have been authorized upon the verification status being set to authorized;

responsive to the number of transactions that have been authorized exceeding a threshold value of transactions, reset, by the server system, the verification status as being unauthorized;

receive, from the payment terminal, an authorization request comprising the account number to authorize a payment transaction, the authorization request being received from the payment terminal after detecting the payment device, and receiving the account number from the payment device, the authorization request including a cardholder verification method (CVM) field indicating that the user was verified and that verification has been performed, wherein the payment terminal is a POS terminal;

responsive to receipt of the authorization request, identify, at the server system, the verification status associated with the user by analyzing the CVM field included in the authorization request; and determine, by the server system, whether to authorize the payment transaction based on the verification status and the number of transactions that have been authorized being lower than the threshold value of transactions, wherein the payment transaction does not comprise a verification process to verify the user.

14. The system of claim 13, wherein the server system is an issuer host system.

15. The method of claim 1, wherein the verification status is valid for only a predetermined amount of time.

16. The method of claim 1, wherein the authorization request is received through an acquirer host computer.

17. The method of claim 1, wherein the signal is an RF signal.

* * * * *